United States Patent

[11] 3,622,592

[72] Inventor Stanley C. Bell
   Penn Valley, Pa.
[21] Appl. No. 709,873
[22] Filed Mar. 4, 1968
[45] Patented Nov. 23, 1971
[73] Assignee American Home Products Corporation
   New York, N.Y.

[54] PYRROLO [2,1-B]BENZOTHIAZOLES
   8 Claims, No Drawings
[52] U.S. Cl. .................................................. 260/304,
   424/270
[51] Int. Cl. .................................................. C07d 91/44,
   C07d 99/10
[50] Field of Search .......................................... 260/304

[56] References Cited
   OTHER REFERENCES
   Oliver et al., J. Am. Chem. Soc., Vol. 80, pages 702– 707 (1958)

Primary Examiner—Alton D. Rollins
Attorneys—Andrea Kafko, Vito Victor Bellino, Joseph Martin Weigman and Dwight J. Potter ABSTRACT: This invention is concerned with 1,2,3,3a-tetrahydro-1-iminopyrrolo[2,1-b]benzothiazoles and 3,3a-dihydropyrrolo[2,1-b]benzothiazol-1(2H)-ones which are pharmacologically active as central nervous system depressants.

PYRROLO [2,1-B]BENZOTHIAZOLES

This invention is concerned with pyrrolo[2,1-b]benzothiazoles. In particular, it relates to 1,2,3,3a-tetrahydro-1-iminopyrrolo[2,1-b]benzothiazoles and 3,3a-dihydropyrrolo[2,1-b]benzothiazol-1(2H)-ones which in standard and accepted pharmacological procedures have demonstrated activity as central nervous system depressants. Further, the 1,2,3,3a-tetrahydro-1-iminopyrrolo[2,1-b]benzothiazoles are useful as intermediates to prepare their corresponding 3,3a-dihydropyrrolo[2,1-b]benzothiazol-1(2H)-ones.

The new and novel compounds within the scope of the present invention are represented by the following structural formula:

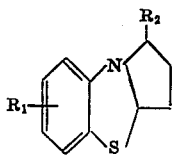

wherein $R_1$ is selected from the group consisting of hydrogen, halogen, lower alkyl and lower alkoxy; and $R_2$ is selected from the group consisting of oxo and imino. As employed herein the terms "lower alkyl" and "lower alkoxy" are meant to include both branched and straight chain moieties having from one to about eight carbon atoms. Typical examples thereof are: 7-chloro-1,2,3,3a-tetrahydro-1-iminopyrrolo[2,1-b]benzothiazole; 1,2,3,3a-tetrahydro-1-iminopyrrolo[2,1-b]benzothiazole; 7-chloro-3,3a-dihydropyrrolo[2,1-b]benzothiazol-1(2H)-one; 3,3a-dihydropyrrolo[2,1-b]benzothiazol-1(2H-one; and 6-bromo-1,2,3,3a-tetrahydro-1-iminopyrrolo[2,1-b]benzothiazole.

The new and novel compounds of the present invention may be prepared by process which is illustrated by the following reaction scheme:

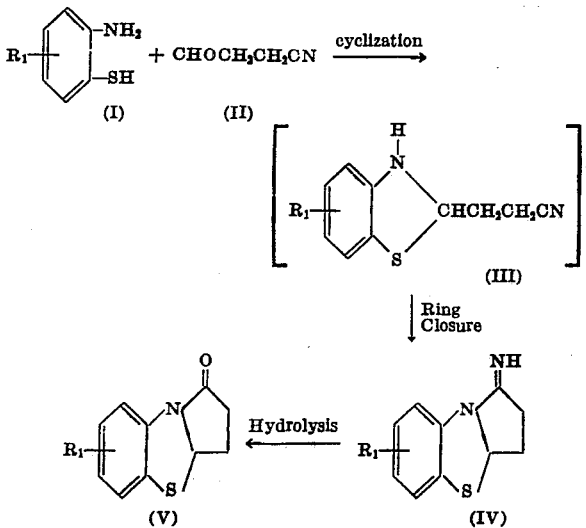

wherein $R_1$ is defined as above. The cyclization and subsequent ring closure reactions are conducted by contacting an appropriate 2-aminobenzenethiol (I) with 3-cyanopropionaldehyde (II) in water, in the presence of a mineral acid e.g. hydrochloric acid, at a temperature range from about 25° to 50° C. for a period of about one to about 5 hours. Thereafter, the reaction mixture is diluted with water, filtered and the filtrate made alkaline by the addition of an alkali metal hydroxide. The precipitated product is then collected, washed with water, dissolved in a dilute mineral acid, filtered and reprecipitated with a base e.g. an alkali metal hydroxide or carbonate, to afford a 1,2,3,3a-tetrahydro-1-iminopyrrolo[2,1-b]benzothiazole (IV) which may be further purified by recrystallization from a suitable solvent, for example, an alkanol, acetonitrile, benzene, chloroform and the like. The bracketed propionitrile compound (III) is a postulated intermediate which is not separated but is herein included for a better understanding of the reaction mechanism of the aforesaid process.

The hydrolysis reaction is effected by contacting an above-prepared 1,2,3,3a-tetrahydro-1-iminopyrrolo[2,1-b]benzothiazole (IV) with a dilute mineral acid e.g. 1 N hydrochloric acid at a temperature range from about 70° to about 120° C. for a period of about one to about 5 hours. When the hydrolysis is complete, the resulting 3,3a-dihydropyrrolo [2,1-b]benzothiazol-1(2H(-one (V) is separated by conventional recovery procedures e.g. the reaction mixture is cooled, filtered and the collected product (V) recrystallized from an appropriate solvent e.g. an alkanol. The starting materials employed in the above-described reaction are either commercially available or easily prepared by procedures well known in the art.

The new and novel 1,2,3,3a-tetrahydro-1-iminopyrrolo[2,1-b]benzothiazole (IV) and 3,3a-dihydropyrrolo[2,1-b]benzothiazol-1(2H)-one (V) compounds of the present invention have been found to possess interesting biological properties. More particularly, these compounds, in standard pharmacological procedures, produce central nervous system depression and are useful as central nervous system depressants. The 1,2,3,3a-tetrahydro-1-iminopyrrolo[2,1-b]benzothiazoles (IV) are also useful intermediates in the preparation of their corresponding 3,3a-dihydropyrrolo[2,1-b]benzothiazol-1(2H)-ones (V).

In the pharmacological evaluation of the central nervous system depressant agents of this invention the in vivo effects of these compounds are tested as follows:

The compound is administered orally or intraperitoneally to three mice (14 to 24 grams) at each of the following doses: 400, 127, 40, 12.7 and 4.0 mg./kg. The animals are watched for a minimum of 2 hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plate method" [Nathan B. Eddy and Dorothy Leimbach, J. Pharmacol. Exper. Therap. 107, 385 (1953)] is used to test for analgesia. The experiment is terminated by subjecting each animal to a maximal electroshock to test for anticonvulsant activity.

The 1,2,3,3a-tetrahydro-1-imino-pyrrolo[2,1-b]benzothiazoles (IV) of this invention when administered orally in the above test procedure induce decreased motor activity and decreased respiration at a dosage range of 4.0 mg./kilo to 12.7 mg./kilo. Alternatively, the 3,3a-dihydropyrrolo[2,1-b]benzothiazol-1(2H)-ones (V) of this invention when administered intraperitoneally in the above procedure induce decreased motor activity and decreased respiration at a dosage range of 127 mg./kilo to 400 mg./kilo.

When the compounds of this invention are employed as central nervous system depressants they may be administered to warm-blooded animals, e.g. mice, rats, rabbits, dogs, cats, monkeys, etc., alone or in combination with pharmacologically acceptable carriers, the proportion of which is determined by the solubility and chemical nature of the compound, chosen route of administration and standard biological practice. For example, they may be administered orally in the solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present central nervous system depressants will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration and are not to be construed as limitations of this invention, many variations of which are possible without departing from the scope and spirit thereof.

EXAMPLE I

To a solution of 25 g. of 2-amino-4-chlorobenzenethiol hydrochloride, 300 ml. of water and 15 ml. of concentrated hydrochloric acid, there is added a solution of 13 g. of 3-cyanopropionaldehyde in 200 ml. of water. After stirring for one hour at room temperature the reaction mixture is diluted with an additional 300 ml. of water, filtered from a gummy residue and the filtrate made basic with a sodium hydroxide solution. The resultant precipitate is then collected, washed with water, suspended in dilute hydrochloric acid, filtered from impurities and reprecipitated with a sodium hydroxide solution to give 6.8 g. of product, m.p. 93–95° C. Recrystallization from isopropanol gave pure 7-chloro-1,2,3,3a-tetrahydro-1-iminopyrrolo[2,1-b]benzothiazole, m.p. 96–98° C.

Anal. Calcd for $C_{10}H_9ClN_2S$: C, 53.45; H, 4.04; Cl, 15.78; N, 12.46; S, 14.27.

Found: C, 53.36; H, 3.85; Cl, 15.80; S, 14.30.

In like manner, 2-amino-5-bromobenzenethiol hydrobromide is reacted with 3-cyanopropionaldehyde to yield 6-bromo-1,2,3,3a-tetrahydro-1-iminopyrrolo[2,1-b]benzothiazole.

EXAMPLE II

To a solution of 50 g. of 2-amino benzenethiol, 600 ml. of water and 30 ml. of concentrated hydrochloric acid, there is added a solution of 25 g. of 3-cyanopropionaldehyde in 400 ml. of water. After stirring for 2 hours at room temperature the reaction mixture is diluted with an additional 450 ml. of water, filtered and the filtrate was made basic with a sodium hydroxide solution. The resultant precipitate is then collected, washed with water, suspended in dilute hydrochloric acid, filtered from impurities, reprecipitated with a sodium hydroxide solution, and recrystallized from acetonitrile to afford 1,2,3,3a-tetrahydro-1-iminopyrrolo [2,1-b]benzothiazole, m.p. 95–98° C.

Anal. Calcd for $C_{10}H_{10}N_2S$: C, 63.13; H, 5.30; N, 14.73; S, 16.85.

Found: C, 63.34; H, 5.49; N, 14.55; S, 16.30.

EXAMPLE III

When the procedure of example I and II is repeated to react the hereinafter listed 2-aminobenzenethiols with 3-cyanopropionaldehyde, the following 1,2,3,3a-tetrahydro-1-iminopyrrolo[2,1-b]benzothiazole are obtained:

| Reactant | Product |
|---|---|
| 2-amino-4-methylbenzenethiol | 1,2,3,3a-tetrahydro-1-imino-7-methylpyrrolo[2,1-b]benzothiazole |
| 2-amino-6-fluorobenzenethiol | 5-fluoro-1,2,3,3a-tetrahydro-1-iminopyrrolo[2,1-b]benzothiazole |
| 2-amino-5-methoxybenzenethiol | 1,2,3,3a-tetrahydro-1-imino-6-methoxypyrrolo[2,1-b]benzothiazole |
| 2-amino-3-ethylbenzenethiol | 8-ethyl-1,2,3,3a-tetrahydro-1-iminopyrrolo[2,1-b]benzothiazole |
| 2-amino-4-iodobenzenethiol | 1,2,3,3a-tetrahydro-7-iodo-1-iminopyrrolo[2,1b]benzothiazole |
| 2-amino-5-butylbenzenethiol | 6-butyl-1,2,3,3a-tetrahydro-1-iminopyrrolo[2,1-b]benzothiazole |
| 2-amino-4-ethoxybenzenethiol | 7-ethoxy-1,2,3,3a-tetrahydro-1-iminopyrrolo[2,1-b]benzothiazole |
| 2-amino-5-propoxybenzenethiol | 1,2,3,3a-tetrahydro-1-imino-6-propoxypyrrolo[2,1-b]benzothiazole |

EXAMPLE IV

A solution of 2.5 g. of 7-chloro-1,2,3,3a-tetrahydro-1-iminopyrrolo[2,1b]benzothiazole, as prepared in example I, in 100 ml. of 1 N HCl is heated on the steam bath for 5 hours. On cooling the precipitate is collected and recrystallized from isopropanol to give 1.85 g. of 7-chloro-3,3a-dihydropyrrolo[2,1-b]benzothiazol-1(2H)-one, m.p. 124–126°C. Anal. Calcd for $C_{10}H_9ClN_2S$: C, 53.45; H, 4.04; Cl, 15.78; N, 12.46; S, 14.27. Found: C, 53.36; H, 3.85; Cl, 15.80; N, 12.20; S, 1430.

Similarly, 6-bromo-1,2,3,3a-tetrahydro-1-imino-pyrrolo[2,1-b]benzothiazole is hydrolyzed to give 6-bromo-3,3a-dihydropyrrolo[2,1-b]benzothiazol-1(2H)-one.

EXAMPLE V

A solution of 5.0 g. of 1,2,3,3a-tetrahydro-1-imino-pyrrolo[2,1-b]benzothiazole in 200 ml. of 1 N HCl is heated on the steam bath for 3 hours. On cooling the precipitate was collected and recyrstallized from isopropanol to give 1.85 g. of 3,3a-dihydropyrrolo[2,1-b]benzothiazol-1(2H)-one.

Anal. Calcd for $C_{10}H_9NOS$: C, 62.82; H, 4.75; cl. 16.74; N, 7.33.

Found: C, 62.84; H, 4.69 Cl, 16.40; N, 7.70.

EXAMPLE VI

Repeating the procedure of examples IV and V to hydrolyze the 1,2,3,3a-tetrahydro-1-iminopyrrolo[2,1-b]benzothiazoles of example III, the following 3,3a-dihydropyrrolo [2,1-b] benzothiazol-1-(2H)-ones are prepared:

3,3a-dihydro-7-methylpyrrolo[2,1-b]benzothiazol-1(2H)-one;

5-fluoro-3,3a-dihydropyrrolo[2,1-b]benzothiazol-1(2H)-one;

3,3a-dihydro-6-methoxypyrrolo[2,1-b]benzothiazol-1(2H)-one;

8-ethyl-3,3a-dihydropyrrolo[2,1-b]benzothiazol-1(2H)-one;

3,3a-dihydro7-iodopyrrolo[2,1-b]benzothiazol-1(2H)-one;

6-butyl-3,3a-dihydropyrrolo[2,1-b]benzothiazol-1(2H)-one;

7-ethoxy-3,3a-dihydropyrrolo[2,1-b]benzothiazol-1(2H)-one; and 3,3a-dihydro-6-propoxypypyrrolo[2,1-b]benzothiazol-1(2H)-one.

What is claimed is:

1. A compound selected from the group consisting of those having the formula:

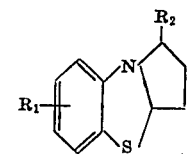

wherein $R_1$ is selected from the group consisting of hydrogen, halogen, lower alkyl and lower alkoxy; and $R_2$ is selected from the group consisting of oxo and imino with the proviso that when $R_2$ is oxo then $R_1$ is not hydrogen or lower alkyl.

2. A compound as described in claim 1 which is: 7-chloro-1,2,3,3a-tetrahydro1-1-iminopyrrolo[2,1-b]benzothiazole.

3. A compound as described in claim 1 which is: 1,2,3,3a-tetrahydro-1-iminopyrrolo[2,1-b]benzothiazole.

4. A compound as described in claim 1 which is: 7-chloro-3,3a-dihydropyrrolo[2,1-b]benzothiazol-1(2H)-one.

5. A compound as described in claim 1 which is:
6-bromo-1,2,3,3a-tetrahydro-1-iminopyrrolo[2,1-b]benzothiazole.
6. A compound as described in claim 1 which is:
1,2,3,3a-tetrahydro-1-imino-7-methylpyrrolo[2,1-b]benzothiazole.
7. A compound as described in claim 1 which is:
1,2,3,3a-tetrahydro-1-imino-6-methoxypyrrolo[2,1-b]benzothiazole.
8. A compound as described in claim 1 which is:
6-bromo-3,3a-dihydropyrrolo[2,1-b]benzothiazol-1(2H)-one.

* * * * *